United States Patent [19]

Majeti et al.

[11] Patent Number: 5,488,412
[45] Date of Patent: Jan. 30, 1996

[54] CUSTOMER PREMISES EQUIPMENT RECEIVES HIGH-SPEED DOWNSTREAM DATA OVER A CABLE TELEVISION SYSTEM AND TRANSMITS LOWER SPEED UPSTREAM SIGNALING ON A SEPARATE CHANNEL

[75] Inventors: Venkata C. Majeti; Mowaffak T. Midani, both of Naperville, Ill.; Richard J. Watson, Catawissa, Mo.; Kenneth A. Zabriskie, Indianapolis, Ind.

[73] Assignee: AT&T Corp., Murray Hill, N.J.

[21] Appl. No.: 221,336

[22] Filed: Mar. 31, 1994

[51] Int. Cl.⁶ .................................................. H04N 7/173
[52] U.S. Cl. .................................. 348/10; 348/12; 455/5.1
[58] Field of Search ..................................... 348/8, 12, 13, 348/6, 7, 10; 358/86; 455/5.1, 3.1, 6.1, 4.2; H04N 7/16, 7/173

[56] References Cited

U.S. PATENT DOCUMENTS

| | | | |
|---|---|---|---|
| 4,599,644 | 6/1986 | Fischer | 358/84 |
| 4,633,462 | 12/1986 | Stifle et al. | 370/85 |
| 4,792,849 | 12/1988 | McCalley et al. | 358/86 |
| 4,829,372 | 5/1989 | McCalley et al. | 358/86 |
| 4,862,268 | 8/1989 | Campbell et al. | 358/141 |
| 5,051,822 | 9/1991 | Rhoades | 358/86 |
| 5,077,607 | 12/1991 | Johnson et al. | 358/86 |
| 5,093,718 | 3/1992 | Hoarty et al. | 358/84 |
| 5,231,494 | 6/1993 | Wachob | 358/146 |
| 5,231,665 | 6/1993 | Auld et al. | 380/20 |
| 5,245,429 | 9/1993 | Virginio et al. | 358/142 |
| 5,255,267 | 10/1993 | Hansen et al. | 370/85.1 |
| 5,260,778 | 11/1993 | Kauffman et al. | 358/86 |
| 5,283,789 | 2/1994 | Gunnarsson et al. | 370/124 |
| 5,319,452 | 6/1994 | Funahashi | 348/6 |
| 5,347,304 | 9/1994 | Moura et al. | 348/12 |
| 5,355,162 | 10/1994 | Yazolino et al. | 348/11 |
| 5,359,367 | 10/1994 | Stockill | 348/552 |

FOREIGN PATENT DOCUMENTS

| | | | |
|---|---|---|---|
| WO8705763 | 9/1987 | European Pat. Off. | H04L 11/16 |
| 11449 | 9/1981 | Japan | H04N 7/08 |
| 406236666 | 8/1994 | Japan | 360/19.1 |
| 9414282 | 6/1994 | WIPO | H04N 7/16 |
| 9414280 | 6/1994 | WIPO | H04N 7/16 |

OTHER PUBLICATIONS

Brochures by Hybrid Networks, Inc. totaling 19 pages.

*Primary Examiner*—Victor R. Kostak
*Assistant Examiner*—Juan G. Acosta
*Attorney, Agent, or Firm*—Charles L. Warren

[57] ABSTRACT

In accordance with an embodiment of the present invention, a home controller receives signals from the cable television system and utilizes a cable demodulator tuned to the RF frequency of the channel which carries the data information. The cable demodulator demodulates the RF encoded signals into conventional baseband digital form which are transmitted to a packet receiver which decodes packets addressed to individual users. If a packet is addressed to the user, the packet receiver transmits the corresponding data such as by an ETHERNET transceiver to the user's personal computer. A communication controller may be utilized to provide an interface between the personal computer and the cable demodulator thereby, enabling the personal computer to select the channel to which the cable demodulator is tuned, in order to permit multiple data channels to be utilized.

6 Claims, 3 Drawing Sheets

CUSTOMER PREMISES EQUIPMENT RECEIVES HIGH-SPEED DOWNSTREAM DATA OVER A CABLE TELEVISION SYSTEM AND TRANSMITS LOWER SPEED UPSTREAM SIGNALING ON A SEPARATE CHANNEL

CROSS-REFERENCE TO RELATED APPLICATION

This application is related to U.S. application entitled "Apparatus And Method For Integrating Downstream Data Transfer Over A Cable Television Channel With Upstream Data Carried By Other Media" and U.S. application entitled "Apparatus And Method For Displaying An Alert To An Individual Personal Computer User Via The User's Television Connected To A Cable Television System", both having the same filing date of the subject application.

BACKGROUND OF THE INVENTION

This invention is directed to customer premises equipment which enables a user's personal computer to receive downstream information over a cable television channel while permitting upstream communications over a separate communication channel such as over the public switched telephone network.

There is an increasing need to provide higher data transfer rates especially from service providers to end users in view of multimedia applications. For example, it requires a substantial amount of data to define a high resolution color picture to be displayed on the monitor of a user's personal computer, and an even greater amount if the picture is to be animated. Conventional modems operating over the public switched telephone network are able to achieve data transfer speeds approaching 30 kilobits per second. Such data rates are too slow to accommodate multimedia applications. In many applications the computer user transmits relatively small amounts of information consisting primarily of requests for information to a service provider and thus, a lower speed channel can be utilized to provide the upstream communications between the user and the service provider without noticeable delays.

In U.S. Pat. No. 4,862,268, a control system for addressable cable television is disclosed which permits the transmission of data using a video format. Data is transmitted in a video format during the vertical blanking interval of a normal television signal.

An interactive videotex system is described in U.S. Pat. No. 5,093,718 wherein users are provided with an increased speed of delivery of information. A plurality of nodes is distributed along a cable TV system wherein each node serves a relatively small group of users and contains in its memory substantially all information needed to communicate with users. A central computer or processing center provides data to the regional nodes and provides updates for information stored at the nodes. Thus, a relatively small group of users is supported by each node and thereby provides increased speed in which information can be delivered to the user.

Broadband RF signals are combined with baseband signals on a single distribution cable as described in U.S. Pat. No. 5,255,267. RF signals above 35 megahertz are simultaneously present with baseband signal below 25 megahertz on a single cable. From a single personal computer node, baseband signals are propagated in both directions while permitting the RF signals to propagate only in a single direction from the RF head-end equipment.

A hybrid access system has been proposed to provide remote computer users with a high-speed (10 megabits per second) access to the Internet network for high-speed downstream data transfer to the users while simultaneously permitting independent lower speed upstream channels to be utilized to transmit user requests for information. It is understood that such a product has been marketed by Hybrid Networks, Inc.

Cable modems operating at up to 10 megabits per second over cable television cables are available from Zenith Electronics and General Instrument Corporation. Thus, there exists a capability for encoding conventional digital information over a cable television channel.

However, there exists a need to provide higher speed data communications to a user's personal computer in an effective and efficient manner, especially in the downstream direction. Preferably, existing resources should be utilized.

SUMMARY OF THE INVENTION

It is an object of the present invention to provide a technological step and advancement in the technology by providing customer premises equipment which permits existing cable television systems to be able to supply high-speed data channels for a user's personal computer.

In accordance with an embodiment of the present invention, a home controller receives signals from the cable television system and utilizes a cable demodulator tuned to the RF frequency of the channel which carries the data information. The cable demodulator demodulates the RF encoded signals into conventional baseband digital form which are transmitted to a packet receiver which decodes packets addressed to individual users. If a packet is addressed to the associated user, the packet receiver transmits the corresponding data such as by an ETHERNET transceiver to the user's personal computer. A communication controller may be utilized to provide an interface between the personal computer and the cable demodulator thereby, enabling the personal computer to select the channel to which the cable demodulator is tuned, in order to permit multiple data channels to be utilized.

DETAILED DESCRIPTION

Figure 1:
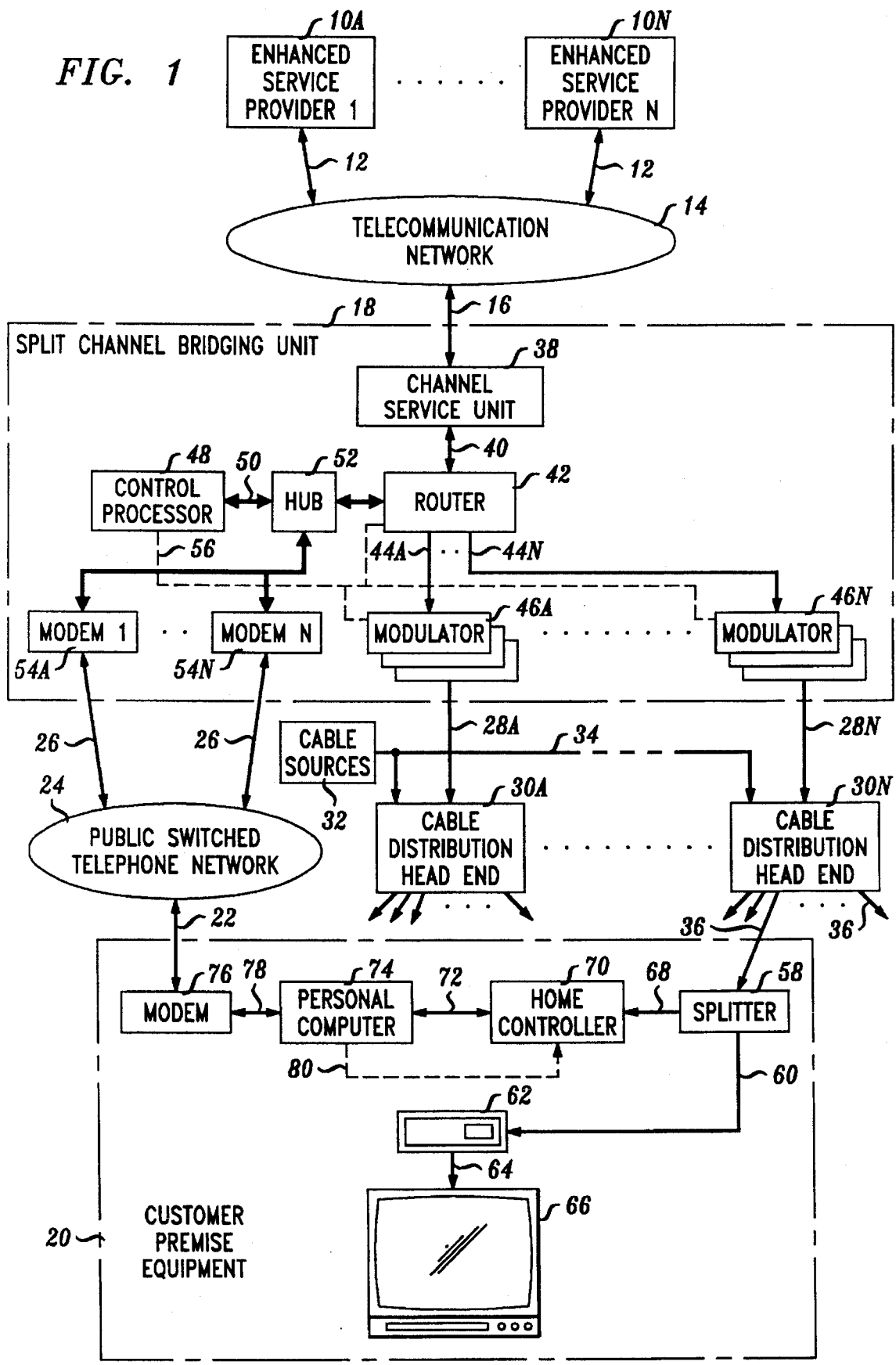
FIG. 1 illustrates a communication system in accordance with an embodiment of the present invention.

FIG. 1 illustrates a communication network in accordance with the present invention in which a plurality of enhanced service providers (ESP) 10A–10N are connected by respective high-speed communication channels 12 with telecommunication network 14. The channels 12 may comprise T1, T3, SMDS, SONET, or ATM channels; the telecommunication network 14 may comprise a conventional high-speed digital communication network capable of handling packet communications. A high-speed communication channel 16 provides communications between the enhanced service providers 10A–10N as supported by telecommunication network 14 and the split channel bridging unit (SCBU) 18. In the illustrative example, the enhanced service providers may consist of individual database providers or gateway service providers which collect a plurality of database information providers into a group allowing users to access any of the databases of the group by a single channel connected to the gateway.

In accordance with an embodiment of the present invention, a user or subscriber utilizes customer premises equipment 20 to transmit requests for information from a service provider subscribed to by the user by communication channel 22, through a public switched telephone network (PSTN) 24 and corresponding communication channels 26 to the split channel bridging unit 18. The request is routed by the split channel signaling unit to the corresponding enhanced service provider to which the request was directed.

User to ESP to SCBU signaling is referred to as upstream signaling. ESP to user or SCBU to user signaling is referred to as downstream signaling, which travels over the PSTN as well. The downstream traffic is expected to contain low-speed authentication and login information, which requires point-to-point connections over the PSTN.

In response to a request for information services, the information service provider may transmit a plurality of packets of information addressed to the requesting user by a communication channel 12, telecommunication network 14, and channel 16 to split channel bridging unit 18. The split channel bridging unit receives the digital information contained in packets and may translate it into a broadband signal imposed on an RF carrier which is transmitted over a communication channel 28 to the one of the cable television distribution head-ends 30A–30N which serves the corresponding subscriber. Other sources of information and cable television programming is delivered to the cable distribution head-ends by cable sources 32 over communication channels 34. The head-end units multiplex the received signals into cable television bandwidth signals such as comprising 6 megahertz channels which are then broadcast by respective cable systems to the cable TV subscribers associated with each head-end distributor. Thus, many users can be served by one 6 megahertz channel.

The customer premises equipment 20 receives the multiplexed cable TV signals on a conventional television cable 36. The customer premises equipment splits the cable television signals and sends one portion to a set top box 62 thereby, permitting the subscriber to use the set top box 62 to select the appropriate channel for viewing on a television 66 connected to the set top box 62. A home controller 70, which receives the other portion of the split signal, demodulates the RF channel which carries the information originated by the enhanced service and transmits to a personal computer 74 of the user, data addressed to the particular user. This completes the communication loop in which information is provided to the user in response to a transmitted request for such information. Thus, in accordance with the present invention, the user is provided with a relatively low-speed data channel to carry requests to the enhanced service providers while providing a relatively high-speed channel from the service providers by means of a cable television distribution system which serves the corresponding user.

The split-channel bridging unit 18 utilizes a channel service unit 38 such as from Digital Link Corporation, that communicates over the high-speed channel 16 with telecommunication network 14. A high-speed communication channel 40 connects the channel service unit to a router 42 such as a from Cisco Corporation. The router routes information packets transmitted by the enhanced service providers to one of modulators 46A–46N over corresponding communication channels 44A–44N. The modulator to which the packet of information is transmitted being dependent upon which cable television head-end unit serves the subscriber to which the packet of information is destined. Thus, the router segregates the packets for distribution to a modulator based on the particular group of users served by a cable television head end. A control processor 48 is preferably coupled by a bidirectional communication network 50 such as an ETHERNET™ network which may utilize a hub 52 which is connected to router 42 and a plurality of modems 54A–54N. The processor 48 contains a database containing records relating to each user (subscriber) served by the split-channel bridging unit and provides information required by router 42 in order to permit the router to properly route data to the appropriate destination cable television head-end unit. The modems 54A–54N may comprise dial-up modems capable of duplex operation over the public switched telephone network such as at speeds less than 30 kilobits per second. These modems provide terminations for dial-up links established by the user which are initiated at the beginning of a communication session in order to make requests of a service provider. During the communication session, each modem provides a duplex communication link between the customer premise equipment 20 and at least one of the enhanced service providers 10A–10N. The modems translate the incoming analog signals into digital format carried by the ETHERNET network 50. The control processor 48 manages communication with regard to the ETHERNET network 50 and controls the transmission of the data received by the modem to router 42 which incorporates such data into a packet transmitted by the channel service unit 38 to the destination enhanced service provider. A control channel 56 couples the control processor 48 with router 42 and modulators 46A–46N. This gives the control processor 48 a communication link in which to transmit control information and signaling to these devices and received status information. This enables the control processor to initialize the router and modulators, to update configuration and routing tables, to monitor status, and to collect measurement information.

The customer premises equipment 20 is served by a conventional cable television cable 36 carrying RF modulated channels assembled and transmitted by cable television distribution head-end unit 30N. The cable 36 is terminated at an RF signal splitter 58 which splits part of the signal onto cable 60 which is connected to a set top box 62. The set top box provides its normal cable television decoding function under the control of the user and provides a single television channel carded by cable 60 which is then transmitted by cable 64 to television 66. RF signal splitter 58 also provides the received signals on communication channel 68 to home controller 70. The home controller 70 demodulates the RF channel on which the information is transmitted from the enhanced service provider. The home controller further provides a packet bridging/routing function in which packets addressed to the specific customer premises equipment, i.e. a specific user, are translated onto a communication channel 72 connected to the user's personal computer 74. Thus, the personal computer receives information which is addressed to the user as transmitted over the cable television system thereby enabling substantially higher transmission rates to be accomplished from the enhanced service provider to the end user as contrasted with the rate at which information could be transmitted from the user by modem 76.s used herein, "modem" means a bidirectional interface between a computer and communications channel; it may utilize analog or digital signaling depending on the communication channel. It will be apparent to those skilled in the art that the user's modem could be physically incorporated as pan of the home controller. The personal computer 74 provides control information and commands by communication link 80 to home controller 70; such commands may identify which RF channel is to be demodulated by the home controller and communication parameters affecting the transmission of the data between the home controller 70 and the personal computer 74.

Figure 2:
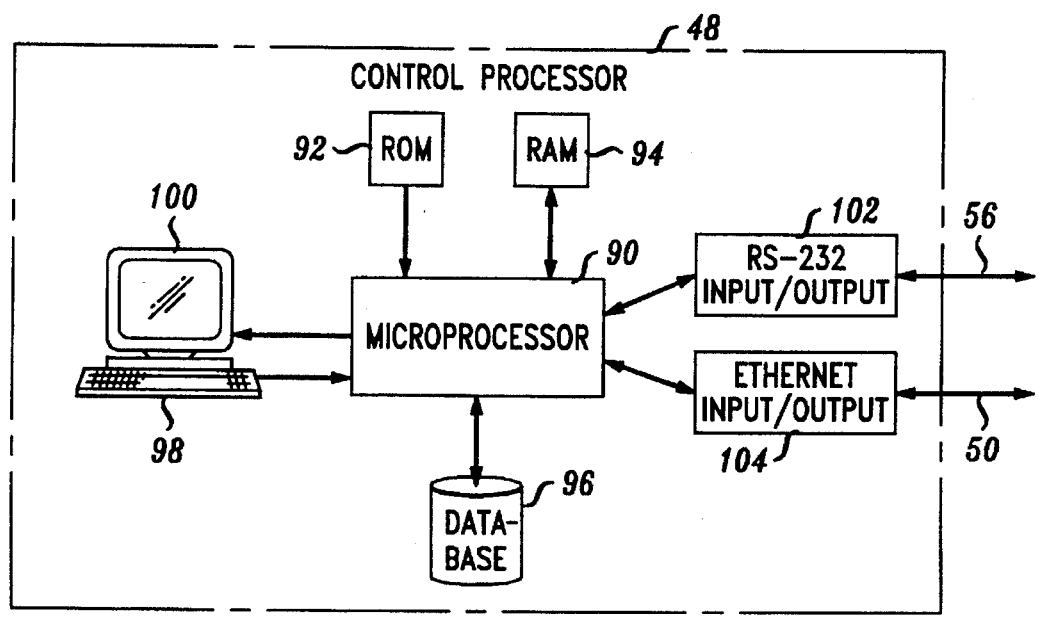
FIG. 2 is a block diagram of a control processor as referenced in FIG. 1.

FIG. 2 is a block diagram of control processor 48 which comprises part of the split-channel bridging unit 18 as shown in FIG. 1. The control processor includes a microprocessor 90 which is supported by read-only memory (ROM) 92, random access memory (RAM) 94, non-volatile storage consisting of database 96, and conventional keyboard 98 and monitor 100. An RS-232 input/output interface 102 is coupled to microprocessor 90 and provides communications between the microprocessor and control channel 56. An ETHERNET input/output interface 104 is coupled to the microprocessor 90 and provides communications between the microprocessor and ETHERNET channel 50.

The RS-232 link 56 provides basic initialization interface to the router and is also used for initializing the modulators and for collecting periodic status information from the modulators. The ETHERNET link 50 provides a higher bandwidth interface between the processor and the router. This interface is used to update routing tables on the router, to obtain status information, and to collect measurements. The ETHERNET interface is also used to carry user's messages to the processor, during session establishment (login) and tear down (logoff). The database 96 contains system configuration data, equipment information, network addresses, session records, subscribers' information, ESP information, authentication keys, and routing information. The router 42 obtains its routing tables from the processor 48 over the ETHERNET interface. It is the responsibility of the processor to download the routing tables to the router, and to maintain them through periodic auditing. The router 42 has its own local database, which is used solely by the router during a power-up. This local database is audited periodically by the processor to maintain data integrity and consistency across the system.

Figure 3:
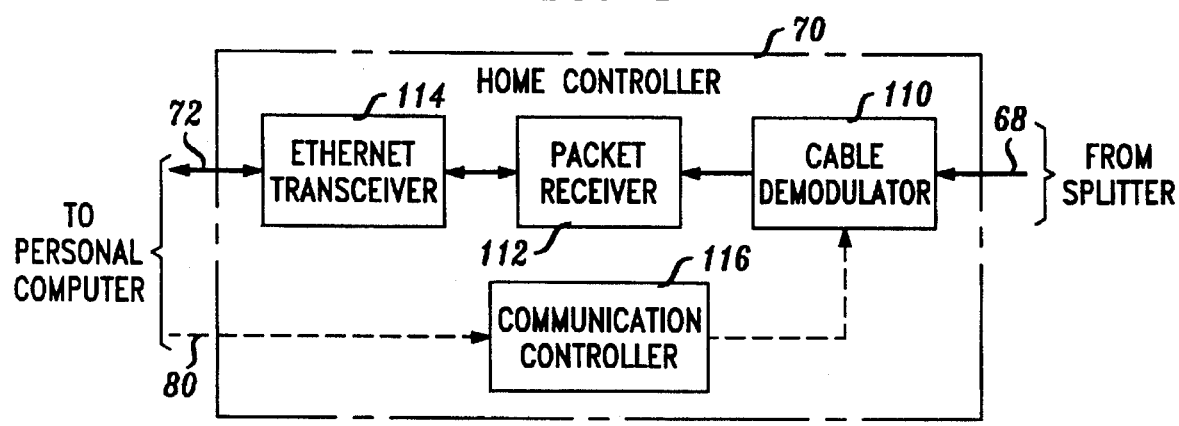
FIG. 3 is a block diagram of a home controller as referenced in FIG. 1.

FIG. 3 is a block diagram illustrating home controller 70 as shown in FIG. 1. Cable 68 which is coupled to cable demodulator 110 carries all of the channels encoded by the cable TV distribution head-end 30N. The cable demodulator is tuneable and is tuned to a channel which carries information originated by a service provider. The purpose of the demodulator is to demodulate the information carried by the RF signals into digital format which is then forwarded to packet receiver 112. The packet receiver 112 receives packets of information transmitted from the enhanced service providers and monitors for packets addressed to the specific customer premise equipment (user) served by the home controller. Packets which are addressed to the user served by the home controller are forwarded by packet receiver 112 to ETHERNET transceiver 114 which provides a communications input/output function over communication channel 72 with personal computer 74. Packets which are not addressed to the user are not transmitted by the packet receiver to the ETHERNET transceiver 114; such packets are discarded since they are not addressed to the particular user. It will be appreciated that the information can be subjected to higher security by using an encryption/decryption algorithm. Control channel 80 from personal computer 74 is coupled to communication controller 116 which provides a communication interface between the command signals transmitted by the personal computer and the signals required to control the timing of cable demodulator 110. Utilizing a tuneable cable demodulator permits the use of more than one transmission channel on the cable TV system to carry information from the service providers. For example, a large number of users supported by a single cable television system may require sufficient concurrent bandwidth to exceed a single channel and thus, the subscribers may be segregated into groups wherein each group is assigned a different communication channel, i.e. a different carrier frequency, upon which information is transmitted to the group by the service providers. The communication controller may comprise a microprocessor supported by conventional memory and communication input/output interfaces to accept communication such as from an RS-232 port with personal computer 74 and provides appropriate signals as required by the tuneable cable demodulator 110 in order to effectuate the control signals which define the RF channel to be demodulated. These requirements will be determined based upon the particular cable demodulator utilized and may consist of a digital address which corresponds to a particular carrier frequency or may require analog voltages or signals which can be supplied by the communication controller such as by utilizing a digital-to-analog converter.

Figure 4:
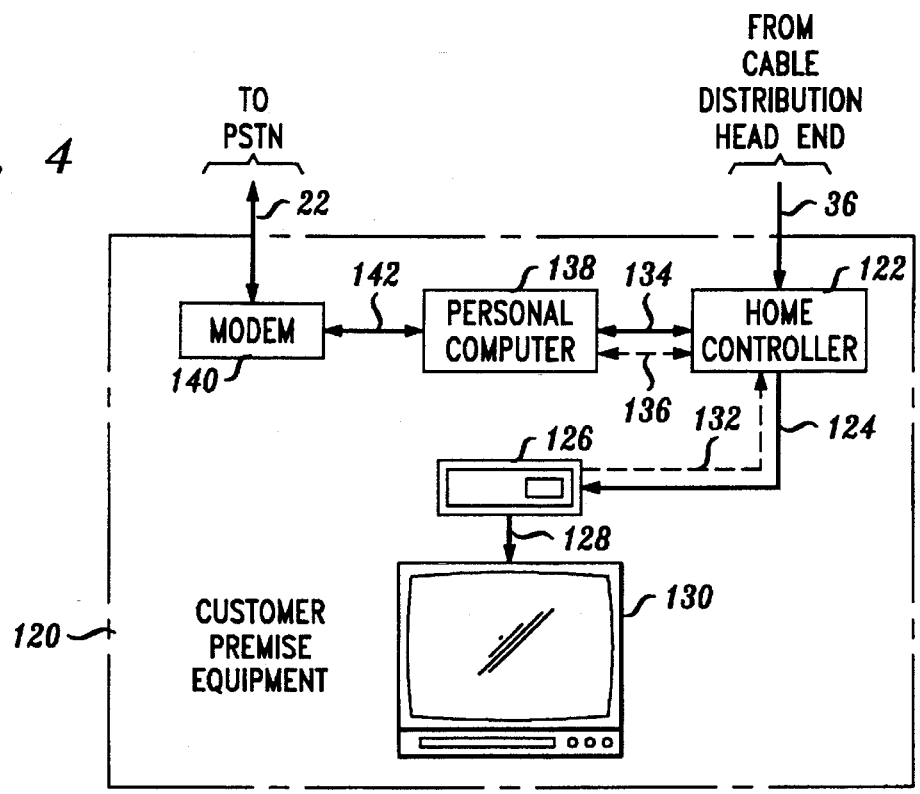
FIG. 4 is a block diagram of customer premises equipment in accordance with an alternative embodiment of the present invention.

FIG. 4 illustrates an alternative embodiment of customer premises equipment 120 which provides an enhanced capability to provide a visual alert displayed on the user's television. A home controller 122 receives the cable television signals transmitted over cable 36. The home controller 122, which is described in more detail below, provides output signals over cable 124 which is coupled to set top box 126. The home controller 122 has the capability of adding additional information to a broadcast television cable channel before passing the signal on cable 124 to the set top box 126. The television channel desired by the user is selected by the set top box which demultiplexes the selected channel and transmits the signal on cable 128 to user's television 130. The set top box 126 is connected to a control channel 132 which is utilized to transmit a signal from the set top box 126 which identifies the channel to which it is tuned to provide this information to home controller 122.

The home controller 122 is coupled to personal computer 138 by a data communication channel 134 which may comprise an ETHERNET communications protocol. The home controller 122 demodulates the data channel which may contain information addressed to the user and transmits any packets addressed to the particular user over channel 134 to the personal computer 138. The personal computer 138 is further coupled to home controller 122 by a control channel 136 which provides information to the home controller identifying the channel to which the cable demodulator is to be tuned. A modem 140 is coupled by communication channel 142 to personal computer 138 and is coupled to the public switched telephone network by telephone line 22. The modem provides a relatively low-speed data communication channel to be established through the PSTN between the enhanced service provider and the user. This permits the user to transmit requests to the service provider. The service providers can also initiate communications by the public switched telephone network with the user's personal computer 138 by initiating a call which can be automatically answered by modem 140. This capability will be explained below with regard to providing a visual alert to the user which is displayed on the user's television set.

Figure 5:
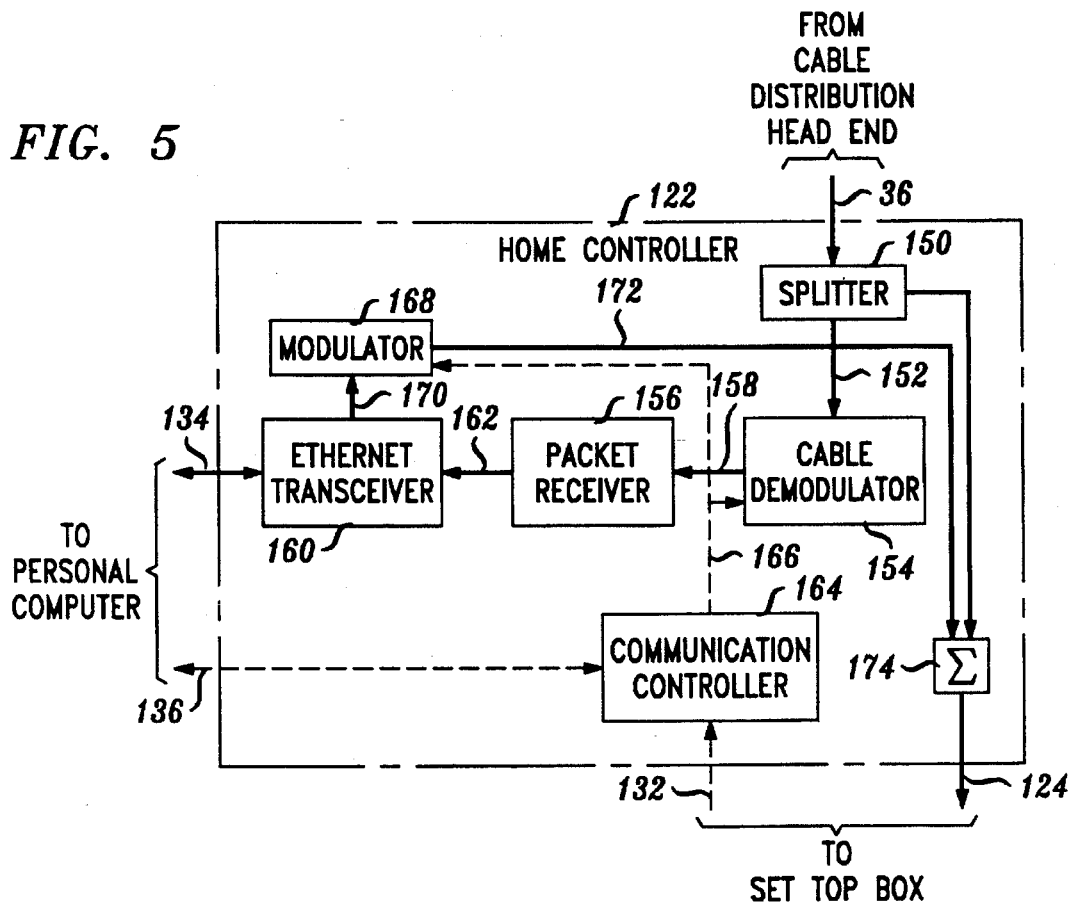
FIG. 5 is a block diagram of a home controller as referenced in FIG. 4.

FIG. 5 is a block diagram of an illustrative embodiment of a home controller 122 as referenced in FIG. 4. Channels received on cable 36 from the cable distribution head-end 30N are split by an internal RF splitter 150 which sends one of the sets of signals to cable demodulator 154 via cable 152. The cable demodulator demodulates the RF encoded signals contained in the channel to which the demodulator is tuned. The cable demodulator transmits in digital format the demodulated signals to packet receiver 156 via channel 158. The packet receiver 156 identifies those packets addressed to the specific user (customer premise equipment) and transmits such information to ETHERNET transceiver 160 via channel 162. Packets which are not addressed to the particular user are discarded, i.e. not transmitted to the ETHERNET transceiver. The ETHERNET transceiver 160 provides a communication link by channel 134 with personal computer 138. This permits data received from the cable distribution head-end 30N to be received by personal computer 74 over the cable television network. A control channel 136, such as an RS-232 channel, provides communications between the personal computer 138 and the communication controller 164 of the home controller 122. The communication controller is further connected by control channel 166 to cable demodulator 154 and modulator 168. Preferably, both the cable demodulator 154 and the modulator 168 are tuneable wherein the tuning of each is controlled in response to signals transmitted by the communication controller 164 via control channel 166. Communication controller 164 may comprise a microprocessor with associated memory and input/output communication interface peripherals. The communication controller receives information on channel 132 identifying the channel to which the set top box 126 is tuned. The communication controller 164 receives via channel 136 commands which control the cable demodulator 154 and modulator 168 including the channel to which each is tuned. The utilization of this function will be described later with regard to an example. The modulator 168 is coupled by channel 170 to ETHERNET transceiver 160 and receives information transmitted by channel 134 from personal computer 138 which defines the visual message to be displayed on the user's television. The modulator 168 comprises a tuneable RF modulator which encodes the digital information received over channel 170 and encodes same into appropriate television transmission signals suited to be transmitted to the user's television 130. The output of modulator 168 is carried by cable 172 to a summation or combiner circuit 174 which combines the output, if any, of modulator 168 with the other set of split signals representing the signals on the cable distribution head-end by channel 36. These combined signals are transmitted by cable 124 to the set top box 126.

EXAMPLE 1 OF OPERATION

One example of operation will best be understood by referring to FIG. 1. Assume that a user associated with customer premises equipment 20 desires to obtain travel information including high definition pictures of possible travel locations and stock market information about a particular stock from an enhanced service provider 10A. The user places a call over the public switched telephone network 24 by controlling modem 76 by personal computer 74. The user calls a predetermined number (or trunk group) assigned to modems 54A–54N of the split channel bridging unit 18. After establishing a two-way communication link between customer premise equipment 20 and the split channel bridging unit 18, the user transmits a code identifying enhanced service provider 10A as the source from which information will be sought. Control processor 48 receives the request, packages the request for service in a packet addressed to enhanced service provider 10A and transmits this packet to router 42 which forwards the packet by channel service unit 38 and communication network 14 to enhanced service provider 10A. Upon receiving the request for service, service provider 10A requests the user to provide a user identification code by transmitting a packet through telecommunication network 14, channel unit 38, and router 42 which routes the packet under the control of control processor 48 to the one of the modems 54A–54N to which the user has established a communication link. This data is transmitted via the modem and public switched telephone network 24 to modem 76 which transfers the information to personal computer 74 which in turn displays the information as a question on the monitor associated with the personal computer. Additional communications between the user and enhanced service provider 10A flow in a like manner until the communication path is verified and established permitting the user to make an inquiry of the substantive information sought. The transmission of such information constitutes secured, relatively low-speed, low bandwidth requirements which is suited to the modem-to-modem link over the PSTN.

Assume that the user now transmits a specific request for information concerning the price and volume history of a stock for the past week. This request is transmitted through the public switched telephone network 24 and routed to enhanced service provider 10A through router 42 in the manner previously described. In this example, enhanced service provider responds to the request by transmitting a reply packet of information containing the requested information along with packet header information specifying the total amount of information to be transmitted in response to this single request. In this illustrative example, the quantity of data is relatively low, for example, 1–5 kilobytes of data. This packet is received by router 42. The router transmits at least the packet header to control processor 48 which makes a determination of whether to have the information transmitted via the modem link over the public switched telephone network 24 or via the cable television distribution system utilizing the larger bandwidth channel carried by cable 36 to the user's customer premise equipment 20. In the illustrative example, a determination is made that the relatively small amount of data would be most efficiently handled and bandwidth conserved by the system by routing it via the modem and PSTN network. Control processor 48 then process the substantive information associated with the stock request and causes the data to be transmitted by one of modems 54A–54N over the PSTN link to the user's equipment 20.

The user now makes a second request for information concerning travel and requests high definition picture information be transmitted illustrating the facilities provided by five different hotels being considered by the user as a vacation destination. This request is transmitted by the PSTN network and arrives at service provider 10A. The service provider analyzes the request and assembles the requested information transmitting a first packet which contains at least a portion of the total requested information along with information contained in the header identifying the total quantity of information to be transmitted to the user in connection with this request. This packet is forwarded to router 42 and then to control processor 48 which decodes the total quantity of information to be transmitted. For high definition pictures, a substantial quantity of data, for example, greater than 1 megabyte of data, will be transmitted. In view of the substantial amount of data to be transmitted, the control processor checks its database and determines that bandwidth capacity is available for the picture information to be transmitted by cable distribution head-end 30N and cable 36. On determining that sufficient bandwidth can be made available for this request, the control processor transmits command information to router 42 directing the router to transmit this packet along with additional packets containing related information via cable 44N to modulator 46N which modulates the data onto an RF channel on cable 28N passed to the cable distribution head-end equipment 30N. This information will then be combined with other RF channels and then transmitted over cable 36 to the user's customer premise equipment 20. It should be noted that this system contemplates the cable television network being utilized in a broadcast mode in which all subscribers served by common cable distribution head-end equipment will receive the same information. The information will remain private since it is addressed to a specific user address; other users' packet receiver will not process the information and hence, will not have access to the information. This high definition picture information is then transmitted via splitter 58 to home controller 70 which demodulates the data carried on the RF channel, forwards the digitally formatted information to a packet receiver which then determines if the packet is addressed to the associated user. Upon determining an address match exists, the packet receiver transmits the information via an ETHERNET link 72 to personal computer 74 which receives the information and provides an appropriate display to the user, using the monitor associated with the personal computer 74. In this same manner, a plurality of packets containing the requested picture information will be transmitted via this same path to reach the user associated with customer premise equipment 20 thereby, fulfilling the user's request more quickly than could have been accommodated by using the public switched telephone network which would require a more restricted bandwidth and hence, a longer time to transmit the same quantity of information.

In the above example, the control processor 48 contains a database that includes the bandwidth capacity of each of the RF data channels associated with modulators 46A–46N in order to be able to provide efficient routing and control of information sent from the enhanced service providers to users via the cable television network. It will be appreciated by those skilled in the art that the intelligence required for making the decision of whether to use the PSTN data path or the cable TV channel(s) could also be made by each service provider. Such an alternative system would require that each service provider be provided with an ongoing update of channel availability for each of the high-speed RF channels available through modulators 46A–46N. Or, the ESP could be provided with a single threshold value of the quantity of data to be transmitted, which is used to determine if the data channels are to be sent over the PSTN or CATV network. Upon making a determination that a substantial quantity of data is to be transmitted to a given user, the service provider could then initiate a request for bandwidth allocation on the cable TV system which would be transmitted by router 42 to control processor 48 which could then assigned a specified bandwidth for a given period of time in order to accommodate the data to be transmitted from the service provider to the user. This type of system requires the cooperative interaction between enhanced service provider and the split channel bridging unit in order to allocate bandwidth and provide for efficient data transmission through the cable television network where appropriate. Such an alternative system has the disadvantage that additional overhead and packet transmissions are required in order to provide the negotiations between the split channel bridging unit 18 and each enhanced service provider in order assign and allocate bandwidth. Utilizing the split channel bridging unit 18 to control usage of the cable TV channels has the advantage that the entire system including all of the service providers are managed in a controlled manner thereby, minimizing the possibility of substantial overload conditions in which excessive data bandwidth is simultaneously requested by a plurality of service providers.

In the example in which the decision making of when to utilize the television RF network is made by the split channel bridging unit 18, it is conceivable that a plurality of users each served by the same cable distribution head-end 30N will request a substantial amount of data from a variety of service providers 10A–10N. Under such conditions, the control processor 48 will mediate the requests and provide control instructions and gating information which sets the amount of data which can be transmitted by any given service provider on the RF cable television network to a user in order to prevent bandwidth overflow conditions. Such decisions can be made on a priority basis depending on the nature of the information or the class of service subscribed to by the user or can be handled by allocate available bandwidth.

A further example of the flexibility of the system resides where modulator set 46N consists of a plurality of modulators each associated with a given RF channel of the cable system thereby, enabling a corresponding plurality of 6 megahertz bandwidth RF data channels to be made concurrently available to the cable distribution head-end 30N for retransmission on the cables 30 to the users. This permits the users to receive high-speed signals over the cable television network via one of a selectable number of RF channels. Under these circumstances, the control processor 48 has the additional responsibility of providing command instructions to router 42 identifying the RF channel on which data to a particular user is to be encoded. The processor 48 further has the responsibility for transmitting control information by the modem link and public switched telephone network 24 to the customer premises equipment 20 to cause the personal computer 74 to utilize the command channel 80 to send control information to home controller 70 causing the RF demodulator to be tuned to demodulate the corresponding RF channel on which the data will be sent to the user. This command signal from control processor 48 by personal computer 74 to home controller 70 will be required to be initiated and completed prior to the transmission of the data on the high-speed cable television channel in order to provide appropriate time for the customer premises equipment to be tuned to and be ready for receipt of the information.

A system in which a plurality of RF channels are available to each of the users provides additional flexibility and increased total bandwidth for data transmission thereby, maximizing the amount of data which can be concurrently transmitted through the cable television system to users. It will be apparent to those skilled in the art that this also places additional control responsibilities on control processor 48 in order to maintain an accurate database identifying assigned bandwidth allocations for transmissions to particular users over each of the RF cable television channels which can be concurrently utilized. It will be apparent to those skilled in the art that a system which utilizes only a single RF channel on the cable television network to transmit data to the users eliminates the need for control line 80 since the RF demodulator can be fixed tuned to the one available television RF channel upon which data is always received.

TELEVISION DISPLAY OF ALERT NOTICE

FIGS. 4 and 5 illustrate an alternative embodiment in accordance with the present invention with regard to a subscriber's customer premise equipment. In accordance with the capability facilitated by this embodiment, a notice can be displayed on the user's television set 130 in order to attempt to get the user's attention where the user does not respond to a message sent to the user's personal computer. A user may request that one of the enhanced service providers provide a monitoring service to alert the user when a predetermined condition exists. For example, the user may be asked to be alerted when a particular stock reaches a predetermined price. In accordance with this service, the enhanced service provider monitors the stock price of the subject stock and upon the stock hitting the targeted price, the enhanced service provider attempts to communicate notice of this condition to the subscriber which requested the monitoring service.

In an illustrative example, the enhanced service provider initiates communication with the user's customer premise equipment 20 by sending a communication initiation packet including the user's modem telephone number by router 42 to control processor 48. In response to receiving the communication request, control processor 48 activates one of modems 54A–54N and causes the modem to initiate a call through the public switched telephone network 24 to modem 140. Assuming that modem 140 is set to auto-answer, the modem answers the incoming call and alerts the personal computer 138 of an incoming call and the need to establish a communication link. Assuming that the personal computer is ON and is running a communication program, this attempt to provide an alert notice to the user will still fail if the user is not present at the personal computer to see the alert displayed on the screen of the computer's monitor. The absence of the user will be apparent by the lack of any response by the user via modem 140 in response to the notice signal. Preferably, the notice signal will request the user respond with a reply indicative that the message was received and may include a request to retransmit a particular code transmitted with the notice information to insure that the specific user was responding to the notice message.

Assume in this example that the user is not present at the personal computer and hence, does not send the appropriate response message. In accordance with one embodiment of the present invention, control processor 48 monitors for a predetermined period of time whether or not the user responds to a particular notice message. If the user does not respond in the predetermined time, control processor 48 initiates an interrogation request sent to the user's personal computer over the public switched telephone network requesting identification of the RF channel to which the set top box 126 is tuned. The personal computer initiates the command request on channel 136 via communication controller 164 and channel 132 to set top box 126. The set top box responds to the request by transmitting an identification of the channel to which the set top box is tuned and hence, the cable television RF channel being displayed on the user's television 130. This information is sent to controller 122 which relays the information by channel 136 to personal computer 138. This information is then routed by modem 140 back to control processor 48. The control processor, upon receiving the viewed channel information, generates a command signal sent by the PSTN and modem 140 to personal computer 138 directing the computer to send a command signal by channel 136 to communication controller 164 which causes the controller to initiate a command sequence on channel 166 causing modulator 168 to be tuned to the cable television RF channel being viewed by the user. The control processor 48 further transmits the notice message by the public switched telephone network to personal computer 138 which transmits the substance of the message on channel 134 to ETHERNET transceiver 160 and the home controller 122. The ETHERNET transceiver forwards the information to modulator 168 by channel 170 thereby causing the modulator to generate an RE signal which is transmitted to combiner network 174 causing a notice message to be combined with the incoming RF signal from splitter 150 and the combined signal being carried by cable 124 to set top box 128 which converts the subject RE channel to the channel being transmitted to television 130 by channel 128. Thus, the user or other persons viewing television 130 will observe a message being displayed such as on the lower one third of the television screen indicating that an alert message is waiting to be transmitted to a named user. In this manner, the user, or perhaps, a member of the user's household will observe the message as displayed on the television set 130 and thereby alert the user to contact the enhanced service provider to obtain the substantive information related to the notice message. A serial number may be associated with the given notice thereby, allowing the user to more directly access the particular message from the service provider.

It will be apparent to those skilled in the art that various modifications utilizing this alternative alert mechanism can be employed depending upon the system design. For example, should the user's telephone line 22 be occupied by a voice conversation, the control processor 48 may periodically retry to initiate communications with modem 140 at predetermined time intervals. Further, the home controller 122 may be designed to be capable of controlling the channel selected by the set top box 126 and may utilize this capability to periodically switch the set top box to another channel which carries the alert message transmitted by modulator 168 on the alternative RF channel for a predetermined period of time, such as 5 seconds at intervals such as at every one or two minutes. This provides an alternative mechanism for providing the alert message to the user by causing the set top box to periodically switch to an alternative RF channel which carries the alert message. This control can be initiated directly by personal computer 138 based on its internal programming in response to a signal received by modem 140 from control processor 48 to initiate the cycle, or may be controlled exclusively by the control processor which sends repetitive commands at the predetermined time intervals which is merely passed through by the personal computer to home controller 122. Further, modulator 168 could be connected directly to the television 130 and in parallel with the output of the set top box 126, thereby allowing the modulator to be fixed tuned to the output channel used by the set top box.

Should the user not be present at the customer premise equipment when such a visually displayed alert is presented on television 130, it may be desirable to incorporate an override control on set top box 126 which will cease the display of such alert messages in the case where others in the household are trying to view a program and do not desire to have the alert continued to be displayed. The user's personal computer can be programmed to store an alert message upon an indication from the set top box that the television is not ON; the computer causing the alert message to be displayed upon the first of the television or computer to be used.

Alternative embodiments of apparatus in accordance with the present invention have been described and shown herein. Further, methods for providing communications utilizing a cable television system have been described. However, the scope of the present invention is defined by the claims which follow.

We claim:

1. A controller that receives packets of data transported via a cable television system, the controller comprising:
  a tuneable demodulator that demodulates radio frequency (RF) signals carried by a channel of said cable television system, said demodulator translating encoded packets of data carried as said RF signals into digitally formatted packets;
  receiver means coupled to said demodulator for identifying ones of said digitally formatted packets having a predetermined address associated with a user;
  means for transmitting data derived from said ones of digital formatted packets to a user's personal computer;
  means, coupled to said demodulator and responsive to control signals received from the user's personal computer, for controlling the RF channel to which said tunable demodulator is tuned to enable reception of encoded packets of data carried over an RF channel of said cable television system as selected by the control signals.

2. The controller according to claim 1 wherein said controlling means comprises means for receiving said control signals, for translating said control signals into selection signals that control the channel to which said tunable demodulator is tuned, and for transmitting said selection signals to said tunable demodulator.

3. A customer premises equipment which supports communications between a user and information providers, said equipment connected to a television system cable that supports high speed communication channels carrying information sent from the information providers and a lower speed transmission channel that carries user generated requests transmitted to the information providers, the lower speed transmission channel being a transmission medium physically separate from the transmission medium that transports the high speed cable transmission channel, the customer premises equipment comprising:
  a tunable demodulator that demodulates radio frequency (RF) signals carried by said high speed cable channel, said demodulator translating encoded packets of data carded as said RF signals into digitally formatted packets;
  receiver means coupled to said demodulator for identifying ones of said digitally formatted packets having a predetermined address associated with a user;
  a modem coupled to said lower speed transmission channel for transmitting requests and receiving control signals that identify one of said high speed channels which carry said ones of said digitally formatted packets;
  a personal computer means, coupled to said modem and operating under the control of a program, for effecting communications between the user and the information providers;
  means coupled to said receiver means for transmitting data derived from said ones of digitally formatted packets to said personal computer;
  said personal computer coupled to said demodulator and transmitting channel selection signals based on said control signals to said demodulator to control the RF channel to which said tunable demodulator is tuned, thus enabling reception of said ones of encoded packets over an RF channel determined by the control signals.

4. The equipment according to claim 3 further comprising means connected to said personal computer means for translating said channel selection signals into demodulator control signals that control the channel to which said tunable demodulator is tuned, and for transmitting said demodulator control signals to said tunable demodulator.

5. A method implemented by customer premises equipment for receiving packets of data transported via a cable that also carries cable television channels comprising the steps of:
  receiving control signals via a data channel that is not carried by said cable, said control signals identifying one high speed data channel transmitted on said cable;
  using a tunable demodulator to demodulate radio frequency (RF) signals transmitted on said high speed data channels, said demodulator translating encoded packets of data carded as said RF signals into digitally formatted packets;
  tuning the tunable demodulator to said one high speed data channel based on said received control signals;
  identifying ones of said digitally formatted packets having a predetermined address associated with the customer premises equipment;
  transmitting data derived from said ones of digitally formatted packets to a personal computer, thus enabling reception of said ones of encoded packets over an RF channel selected by the control signals.

6. The method according to claim 5 wherein said receiving step comprising receiving said control signals which are generated by apparatus not part of said customer premises equipment so that the tuning of the demodulator is controlled remote from the customer premises equipment.

* * * * *